Sept. 4, 1934.       R. P. BARENNES       1,972,674
LUG MATRIX FOR TYPE METAL
Filed April 25, 1931        3 Sheets-Sheet 1

Fig.4   SIZE
        OF
    DRIVING CLUTCH
        (2)

Inventor:
R. P. Barennes
by
E. F. Wendroth
Atty.

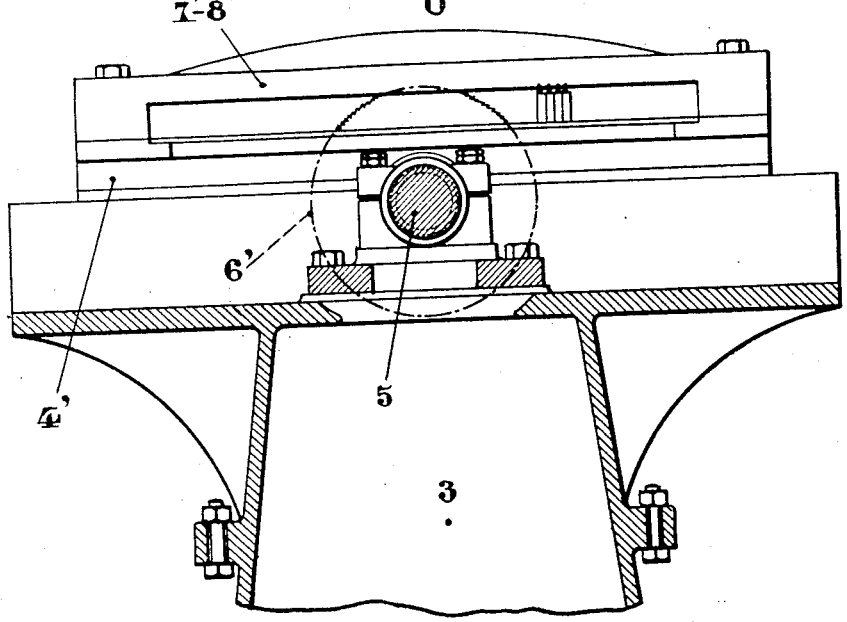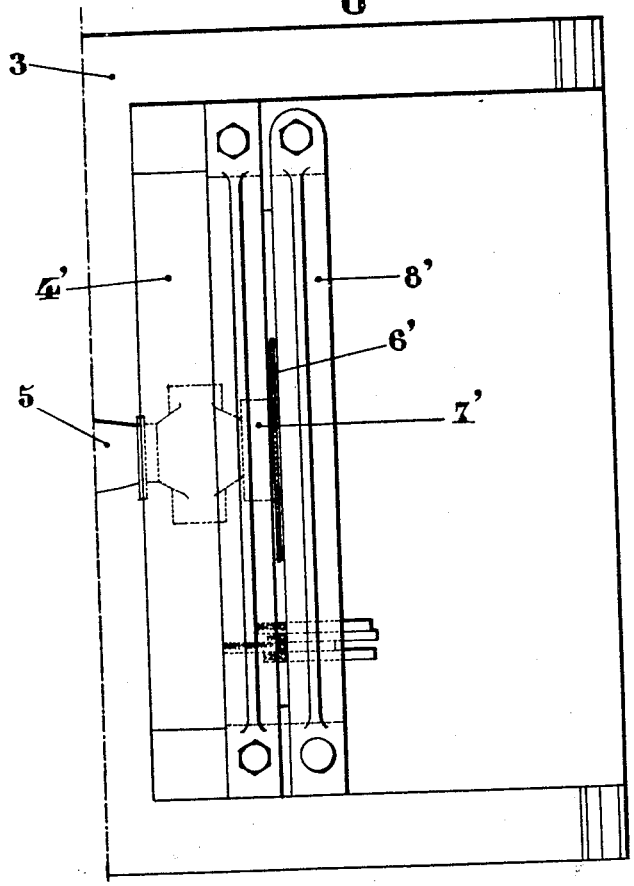

Patented Sept. 4, 1934

1,972,674

UNITED STATES PATENT OFFICE 1,972,674

LUG MATRIX FOR TYPE METAL

Robert P. Barennes, Bordeaux, France

Application April 25, 1931, Serial No. 532,908
In France May 5, 1930

1 Claim. (Cl. 199—66)

Tabular work or, in other words, the setting up of tabulated work in type, offers such difficulties when one attempts to execute it with composing machines that manual composition is generally resorted to, for preference, notwithstanding the disadvantage of the high cost of labor.

The aforementioned difficulties arise principally from the fact that, in tabular work, the length of the lines is extremely varied while the composing machine casts lines always the same length. The changing of the length of the lines is impossible with certain composing machines (which produce a uniform justification of twenty-one pica); on those machines where such a change is possible it can only be effected at the cost of a certain amount of labor, either by displacing the jaws or by changing the justification stops: it is out of the question to repeat such operations for each line of varying length.

Attempts have been made to compose lines of text with very varying justifications on a typographical machine by composing all the lines on the largest justification and setting blanks in front of the lines on lesser justifications but it is impossible to obtain perfect alignment by this means on account of the varying thicknesses of the matrices and also because the space bands do not rise to the same height in each line. The lines must then be sawn off one by one which entails the adjustment of the saw for each justification and taking into account of the width of the saw cut and the play of the saw.

This method of composition entails high costs and only permits of obtaining very imperfect results.

The present invention makes it possible to effect the setting up of tabular work on the composing machine with a precision which compares with that obtained in manual composition without losing any of the advantages procured by mechanical composition, that is to say under conditions which are as completely automatic as can be desired.

This result is attained by the use of a matrix of a special type, which matrix constitutes one of the fundamental characteristics of the invention and which is applied, when composing, as is described hereinafter.

The invention is further characterized by a process of composition comprising in particular the use of the aforementioned matrices and by a special form of saw specially contrived to make the sawing of the lines set up conformably with the invention, to the various lengths desired, easy, rapid and automatic.

To apply the invention when it is desired to compose texts with different justifications, the blank corresponding to the unused portion of the line is first set up, for each line, with em quadrats or en quadrats of various bodies which can be effected within half a point which is the maximum precision necessary. Then before commencing to compose the text the special matrix is inserted, this is an em quadrat matrix provided with a hole intended to receive the molten metal thus forming a tenon or lug on the line; the text is then composed and the same operation repeated for each of the following lines.

The lines of type, or slugs, thus obtained are assembled by setting all the lugs in line which automatically ensures the alignment of the commencement of the composition of the various lines, after which they are sawn so as to cut off the blank corresponding with the unused portion of each line.

For the purpose of making the invention more comprehensible, an example of its application to the composition of four lines of text on four different justifications has been shown on the attached drawings:

Figure 4 shows the text to be set up;

Figures 9 to 12 are a representation in diagram, and purely as an example, of a method of embodiment of a saw specially adapted for the cutting up of the slugs made conformably with the invention;

Figure 9 is a front view;

Figure 10 is a section through X—X of Figure 9;

Figure 11 is a plan view in which the slugs that are to be sawn are not yet in alignment;

Figure 12 is a part plan view showing the lines which have been brought into alignment ready to be sawn.

Figure 1:
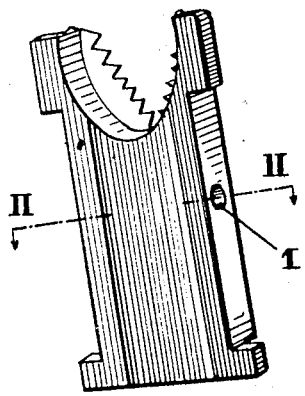
Figure 1 represents the special matrix shown in perspective.
Figure 1A:
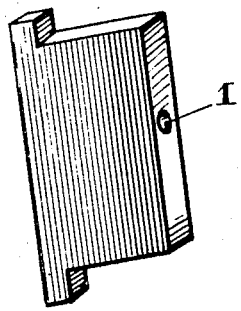
Figure 1a is another embodiment of the special matrix.
Figure 2:
Figure 2 is a section, through II—II, of Figure 1.

As shown in Figures 1, 1a and 2, the special matrix is provided with a cavity 1, preferably conical in shape, the depth of the said cavity always being less than the distance by which the molding wheel withdraws after casting in order to permit of the disengagement of the cast lug.

When drilling cavity 1 care is taken to leave a side wall on either side of the matrix in order to avoid running of the lead when casting.

The special matrices in question are of the same thickness for all bodies; in principle they are equal to a 12 en quadrat.

Figure 3:
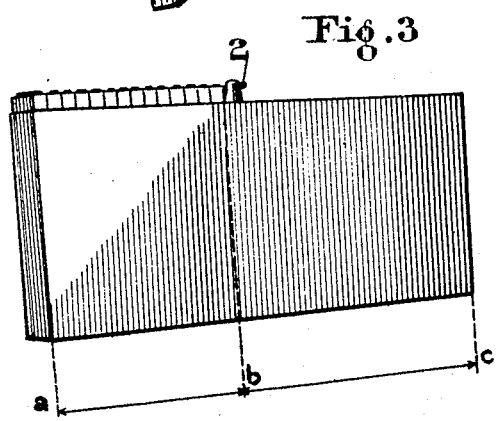
Figure 3 shows, in perspective, a line or slug composed conformably with the invention as it is ejected from the composing machine.

As indicated hereinabove composition is commenced with em quadrat and en quadrat matrices to make up the blank corresponding to the unused portion of the line and this work is completed, before commencing to compose the text, by inserting the special matrix shown in Figures 1 and 1a; the text is then composed in the customary manner. Slugs are thus obtained such as shown in Figure 3 in which $ab$ is the serviceable portion and $bc$ the portion which is to be suppressed, these two portions being separated from one another by lug 2, the positioning of which varies of course according to the length of the text (refer to Figure 5).

Figure 6:
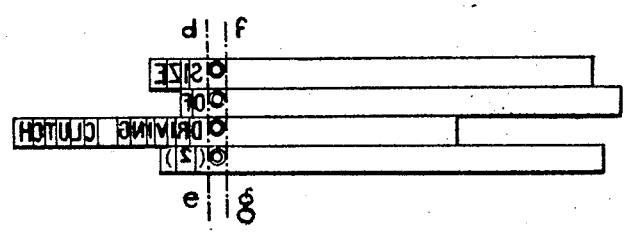
Figure 6 shows the same slugs after they have been placed in alignment by means of their lugs for the purpose of being cut with the saw.

Owing to the existence of lugs 2 the alignment of the text of the various lines is effected with the greatest facility since it suffices, as shown in diagram in Figure 6, to position the several lugs 2 between two rules (indicated in the figure by composite broken section lines $d\ e$ and $f\ g$), in order to obtain automatically the alignment of the lugs and consequently that of the different texts.

It is advantageous to carry out this operation actually on the saw which is to be used for the cutting of the lines. This sawing may, in principle be effected with any saw of the ordinary type but it is preferable for the sake of convenience and precision in the work to be effected to use the special saw shown in Figures 9 to 12 which constitutes one of the characteristics of the present invention.

Figure 9:
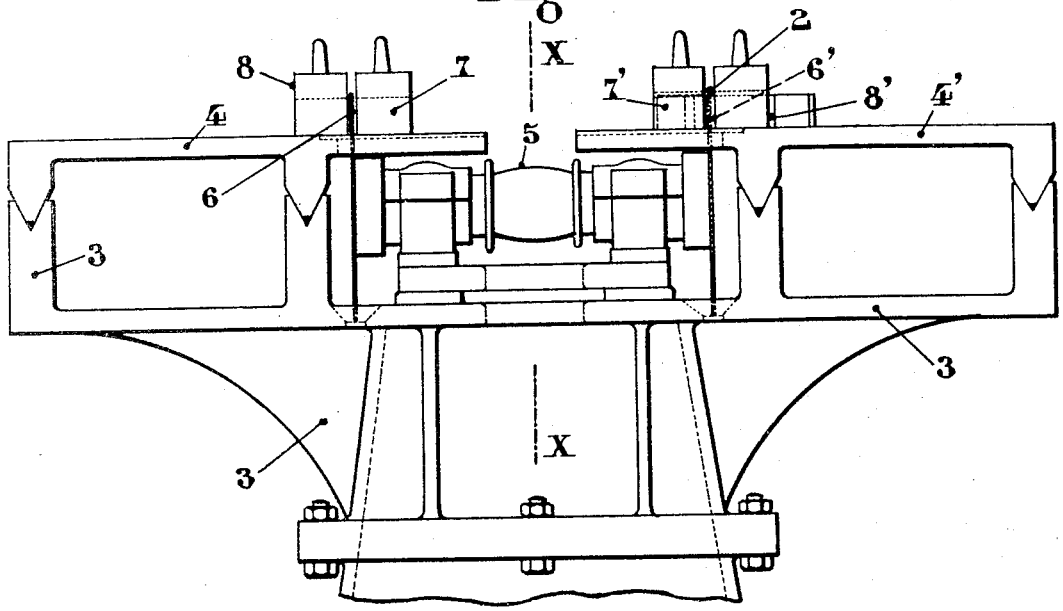
Figure 11:
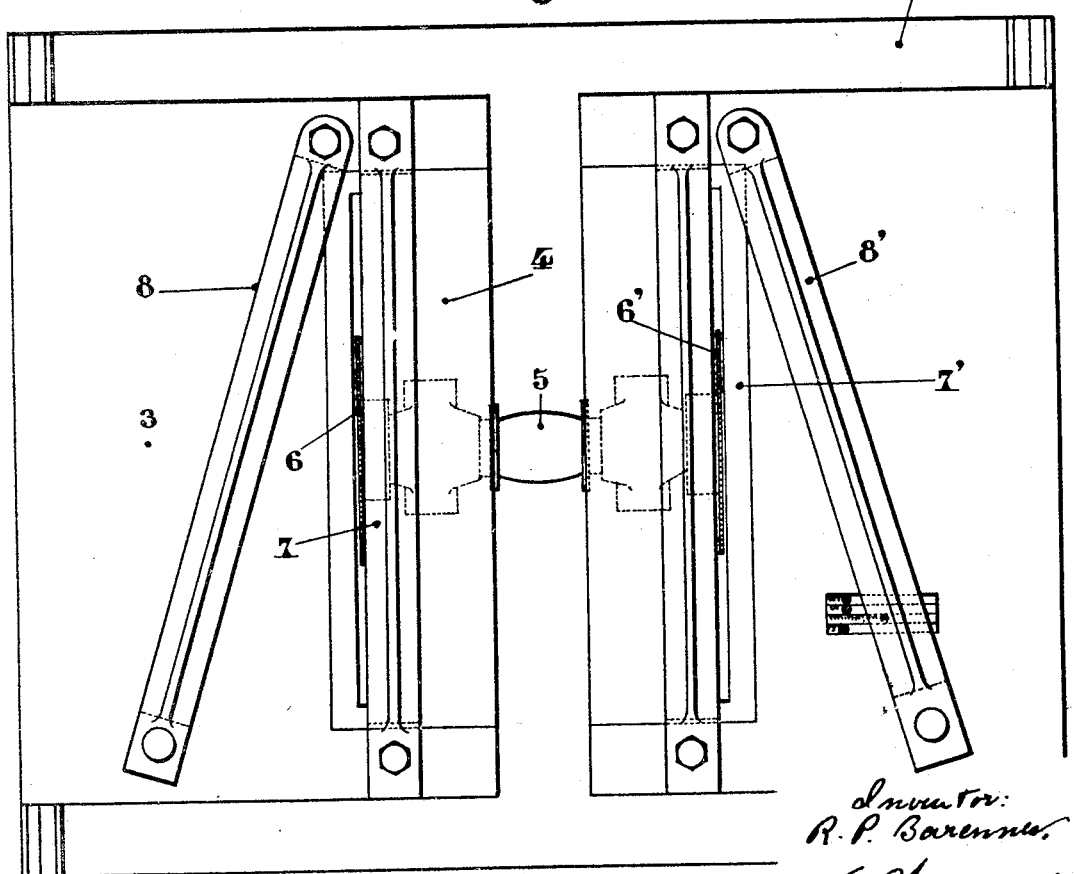

As shown in Figure 9 this saw comprises a frame 3 on which is positioned a movable table intended to receive the slugs to be sawn. For convenience in working two similar tables 4 and 4', set on either side of driving pulley 5 of saws 6 and 6', have been provided. This arrangement makes it possible to saw the lines on either side of the machine as may be deemed preferable; in case of need it also permits of two operators working at the same time.

Two rules or stops are provided in combination with each of the saws 6 and 6', one 7 (or 7') is fixed and the other, 8 (or 8') is pivotally mounted. The rules are cut out (refer to Figures 9 and 10) in such a way as to allow the passage of the slugs but to stop lugs 2; the movable rules serving for the purpose of pushing the lugs up against the fixed stops.

The distance separating that face of each fixed rule which is placed towards the corresponding saw from the outside face of the said saw is equal to the distance from the inner face of lug 2 to the commencement of the text; the position of the saw along its axis may be modified in order that this positioning may be maintained under all circumstances.

Figure 5:
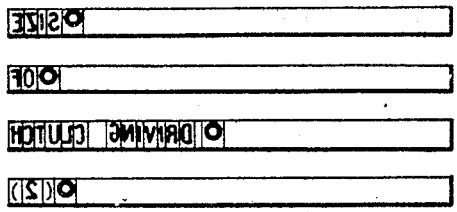
Figure 5 represents the four lines, or slugs, of the said text in the condition in which they are ejected from the composing machine.

The method of operating this machine is readily understood: Assuming that it is desired to print the four lines of text shown in Figure 4, the four lines of type shown in Figure 5 are set up in the composing machine as explained hereinabove, the take of lines is then placed on one of the tables of the machine and made to pass under the corresponding fixed rule; the pivotally mounted rule is then caused to rotate until all the lugs are caught between the two rules; they are then placed in perfect alignment, the surfaces of the rules placed opposite one another taking up the position of lines $de$ and $fg$ shown in Figure 6.

It is then sufficient to wedge up the take by any means commonly in use (which means is not shown) and to bring the take of lines up against the saw by moving the table.

Figure 7:
Figure 7 shows the slugs after the sawing off and removal of the unused portions.
Figure 8:
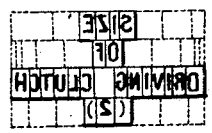
Figure 8 shows the four lines assembled and set up ready to produce the impression of the text in Figure 4.

After this sawing has been effected the four lines of text shown in Figure 7 are obtained on different justifications and all that remains to be done is to fill in the composition with em quadrat or en quadrat spaces as shown in Figure 8.

I claim:

In matrices for the production of type bars, a matrix having a recess in the casting surface thereof of greater depth than the corresponding depth of the recesses in the similar letter matrices whereby a projection over type high may be formed to serve as a guide at any desired position in the type bar or at the end thereof.

ROBERT P. BARENNES.